(12) United States Patent
Vermont et al.

(10) Patent No.: US 10,100,966 B2
(45) Date of Patent: Oct. 16, 2018

(54) INSULATION COMPOSITION AND METHOD TO DETECT WATER IN AN INSULATION COMPOSITION

(71) Applicants: RNS TECHNOLOGIES BV, Voorburg (NL); Erzsebet Josephus Maria van der Spek, Landsmeer (NL)

(72) Inventors: Petrus Antonius Vermont, Landsmeer (NL); Walter John Chappas, Jr., Raleigh, NC (US); Walter John Chappas, Raleigh, NC (US)

(73) Assignee: RNS TECHNOLOGIES BV, Voorburg (NL)

( * ) Notice: Subject to any disclaimer, the term of this patent is extended or adjusted under 35 U.S.C. 154(b) by 399 days.

(21) Appl. No.: 14/012,811

(22) Filed: Aug. 28, 2013

(65) Prior Publication Data

US 2013/0344762 A1    Dec. 26, 2013

Related U.S. Application Data

(63) Continuation of application No. PCT/EP2012/051034, filed on Jan. 24, 2012.
(Continued)

(51) Int. Cl.
*F16L 58/10* (2006.01)
*F16L 59/02* (2006.01)
(Continued)

(52) U.S. Cl.
CPC ............ *F16L 58/1063* (2013.01); *B32B 5/26* (2013.01); *F16L 59/029* (2013.01); *F16L 59/04* (2013.01);
(Continued)

(58) Field of Classification Search
USPC .......................... 442/301, 319, 76, 295, 370
See application file for complete search history.

(56) References Cited

U.S. PATENT DOCUMENTS

| | | |
|---|---|---|
| 4,592,751 A | 6/1986 | Gegelys |
| 5,279,148 A | 1/1994 | Brandes |

(Continued)

FOREIGN PATENT DOCUMENTS

| | | |
|---|---|---|
| DE | 3930530 A1 | 3/1991 |
| JP | 2002-181280 | 6/2002 |

(Continued)

OTHER PUBLICATIONS

European Search Report—Application No. 12702214.3, Ref. P116318EPPC; dated Sep. 30, 2015.

*Primary Examiner* — Lynda Salvatore
(74) *Attorney, Agent, or Firm* — Nixon Peabody LLP (57) ABSTRACT

The invention is directed to an insulation composition comprising the following layers (a) a hydrophobic, moisture permeable layer composed of a woven, non-woven, or knit fibrous material, (b) a hydrophilic wicking layer, (c) an insulation material layer. The invention is also directed to a method to remove water from an insulated metal transport conduit comprising a metal transport conduit and an insulation composition, wherein the insulation composition comprises of a layer (b1) of a high void material, by supplying a stream of gas to the layer of high void material at a first point and discharging a stream of the gas and any water picked up from the high void material at a second point. The invention is also directed to a method to detect and locate liquid water in an insulation composition positioned around a metal transport conduit wherein the insulation composition comprises of a layer of wicking material (Continued)

and wherein the method is performed by measuring the local electric conductivity in said wicking material.

16 Claims, 8 Drawing Sheets

Related U.S. Application Data (60) Provisional application No. 61/435,824, filed on Jan. 25, 2011.

(51) Int. Cl.
    *F16L 59/04* (2006.01)
    *B32B 5/26* (2006.01)

(52) U.S. Cl.
    CPC ...... *Y10T 442/3976* (2015.04); *Y10T 442/494* (2015.04)

(56) References Cited

U.S. PATENT DOCUMENTS

| | | | |
|---|---|---|---|
| 5,364,686 A | 11/1994 | Disselbeck et al. | |
| 5,731,062 A | 3/1998 | Kim et al. | |
| 6,701,556 B2 | 3/2004 | Romano et al. | |
| 6,918,140 B1 * | 7/2005 | Cooper | A41D 1/084 2/228 |
| 7,314,840 B2 * | 1/2008 | Baychar | A43B 5/0405 36/117.3 |
| 2004/0137181 A1 | 7/2004 | Ruid et al. | |
| 2004/0175516 A1 | 9/2004 | Schmitz et al. | |
| 2005/0155663 A1 | 7/2005 | Jacques et al. | |
| 2007/0131299 A1 | 6/2007 | Kornbleet | |
| 2007/0178283 A1 | 8/2007 | Tigerfeldt | |
| 2008/0020663 A9 | 1/2008 | Walters | |

FOREIGN PATENT DOCUMENTS

| | | |
|---|---|---|
| JP | 2009-024813 | 2/2009 |
| RU | 1772509 | 10/1992 |
| WO | 91 18237 | 11/1991 |
| WO | 199118237 A1 | 11/1991 |
| WO | 95/19523 A1 | 7/1995 |
| WO | 99/09346 A1 | 2/1999 |
| WO | 2005038330 A1 | 4/2005 |
| WO | 2007/061311 A1 | 5/2007 |
| WO | 2008036025 A1 | 3/2008 |
| WO | 2010/050617 A1 | 5/2010 |
| WO | 2010/053813 A2 | 5/2010 |
| WO | 2010/143948 A1 | 12/2010 |
| WO | 2011 010577 | 1/2011 |

* cited by examiner

INSULATION COMPOSITION AND METHOD TO DETECT WATER IN AN INSULATION COMPOSITION

CROSS REFERENCE TO RELATED APPLICATIONS

This application is a Continuation Application under 35 U.S.C. § 120 of International Application No. PCT/EP2012/051034 filed Jan. 24, 2012, which designates the United States, and which claims benefit under 35 U.S.C. § 119 of U.S. Provisional Patent Application Ser. No. 61/435,824 filed Jan. 25, 2011, the contents of each of which are incorporated herein by reference in their entireties.

FIELD OF THE INVENTION

The invention is directed to an insulation composition comprising a wicking layer and an insulation layer. The invention is also directed to an insulated metal transport conduit, a method to remove water from an insulation composition and a method to detect water in an insulation composition.

BACKGROUND OF THE INVENTION

Corrosion under insulation (CUI) is corrosion that develops over time beneath thermal insulation used on pipes, tanks and other manufacturing and process equipment. Wherever piping, tanks or equipment are thermally insulated, there is potential for CUI. It is usually caused by condensation, rainwater, cleaning fluids, etc., that permeate into the insulation and attack the metal surface of the above equipment. Regardless of how securely insulation materials are applied to a substrate material, there will inevitably be areas where water can seep in, thereby creating conditions that subsequently cause corrosion and damage to the metal surface. As a consequence of the above, CUI may occur at any location and time, even at locations or under conditions which are initially regarded as less likely or even non-likely to experience corrosion.

Various publications are directed to insulation compositions or methods which aim at reducing the content of water in said insulation composition.

WO 2005/038330 described an insulation system, wherein a thermally insulating layer is arranged around a pipe. At the exterior of the insulating material a layer of hygroscopic material and a outer layer of a vapor barrier is present. JP2002181280 describes a method wherein through the insulation material wound around a pipe a gas of a temperature different from ordinary temperature in the inner part is passed. This gas picks up the water which is discharged at another point.

WO 91/18237 describes an insulation system comprising a layer of a heat insulating material for a conduit or container having a surface temperature below the dew point of the ambient air and in particular an insulating system for insulating cold pipes and conduits and containers for the transportation or storage of cooling media. The insulating system has layers of a hygroscopic wicking material on both sides of a thermally insulating material which is adapted to be arranged around a pipe. The two layers communicate with each other through an opening in the thermally insulating material, whereby condensate by capillary action can be transported from the inner layer to the outer layer. The wicking material is either directly applied onto the exterior of the cold pipe itself or a diffusion proof layer, such as a plastic film, is placed in direct contact with the exterior of the cold pipe. This plastic film should prevent condensed water from getting into direct contact with this exterior surface such to avoid corrosion.

WO 95/19523 describes an insulation around a pipe wherein strips of an hydroscopic material are equidistantly spaced from each other along the length of the pipe. The strips extend from a direct contact with the metal surface to the outside of the insulation where it is exposed to the ambient air and forms an evaporation surface.

A common feature of the prior-art solutions exemplified by WO 91/18237 and WO 95/19523 to the problem with removing of condensate is that a hygroscopic material is arranged on the metal surface on which condensate is formed. Another common feature is that the hygroscopic material is brought into direct contact with the ambient air.

A problem with the above insulation compositions is that either water is only removed locally in case strips are used. In case a wicking layer totally covers the metal layer corrosion may still take place, especially when the metal surface has a relatively high temperature. Such high temperature metal surfaces are for example encountered in transport conduits for steam. The use of a plastic film as described in WO 91/18237 will not avoid corrosion. This is because when such a film is damaged then liquid water will enter the space between the film and the metal pipe surface by means of capillary forces. Corrosion may then take place because this water cannot escape.

SUMMARY OF THE INVENTION

The invention is directed to an insulation composition comprising the following layers
 (a) a hydrophobic, moisture permeable layer composed of a woven, non-woven, or knit fibrous material,
 (b) a hydrophilic wicking layer
 (c) an insulation material layer The invention is also directed to an insulated metal transport conduit comprising a metal transport conduit and insulation composition as described above.

Applicants found that by using insulation composition as above water is less likely to accumulate on the surface of the metal transport conduit and as a consequence corrosion of the metal surface is further avoided.

The invention is also directed to a method to remove water from an insulated metal transport conduit comprising a metal transport conduit and an insulation composition wherein the insulation composition comprises of a layer (b1) of a high void material by supplying a stream of gas to the layer of high void material at a first point and discharging a stream of the gas and any water picked up from the high void material at a second point.

The invention is also directed to a composition comprising the following layers
 (a) a hydrophobic, moisture permeable layer composed of a woven, non-woven, or knit fibrous material,
 (b) a hydrophilic wicking layer, and a layer (b1) of a high void material.

The invention is also directed to a method to detect and locate liquid water in an insulation composition positioned around a metal transport conduit wherein the insulation composition comprises of a layer of wicking material and wherein the layer of wicking material comprises measuring means to measure the presence of liquid water.

The invention is also directed to an insulated metal transport conduit comprising a metal transport conduit, an insulation composition and a cover sheet (e), wherein between insulation composition and cover sheet (e) a layer (d) of high void material is present.

DETAILED DESCRIPTION OF THE INVENTION

The invention shall be described in more detail and preferred embodiments will be discussed and their specific advantages.

The insulation composition according to the invention comprises a layer (a) a composed of a hydrophobic, moisture permeable layer composed of a woven, non-woven or knit fibrous material. The function of this layer is to separate the wicking layer, which may contain water, off a metal surface of the conduit or vessel which is to be insulated. This layer (a) should be sufficiently porous and thin as to ensure that any water on said surface is physically pressed up into the wicking layer (b). An advantage of the fact that layer (a) is moisture permeable is that no liquid water can be trapped onto the metal surface. This avoids corrosion. The meaning of the terms hydrophobic and hydrophilic as used to describe layer (a) and layer (b) is only to indicate that layer (a) is less hydrophilic than the wicking layer (b). The hydrophilic property of the layer will be defined by the material of the layer and the structure. For the present invention a more hydrophilic material will more quickly take up a volume of water per volume of layer material. The result of the fact that layer (a) is less hydrophilic than the wicking layer (b) is that any water which may be present on the surface of the metal object to be insulated is readily transported away from said surface and into the wicking layer. The combination of layers provides an effective pumping system for transporting liquid water off the surface of the process equipment to be insulated thereby leaving a dry surface. Furthermore the wicking layer changes the effective surface area of a droplet from a few square millimeters as present on the surface of the equipment to be insulated to a few square centimeters resulting in approximately a 100× improved evaporation rate of the water droplet. This allows removal of liquid water through evaporation and transport of the gaseous water.

The material of layer (a) may, optionally, be treated with a surfactant or coating or otherwise processed to impart a desired level of wettability and hydrophilicity. The layer (a) should be sufficiently porous to water such that water can readily penetrate through its thickness. Layer (a) may suitably be composed of the same material used as topsheet in sanitary products such as diapers and sanitary napkins, wherein the topsheet is the sheet is made of a synthetic fiber and which is in contact with the skin of the user. Suitable fibrous materials for layer (a) are synthetic fibers, for example, carbon, polyester, polyether, polyethylene (PE) or polypropylene (PP) fibers. The material of layer (a) is suitably present as a spunbonded web or as a bonded-carded web because they are easier to manufacture. An example of a suitable layer (a) is a non-woven, spunbond, polypropylene fabric. For applications wherein the temperatures can vary between −4 and 175° C., for example when the insulation is used around a transport conduit in a refinery, it is preferred to use a material which is dimensionally stable under these conditions. Examples of suitable materials for such applications are polyethylene terephthalate or polyether sulphone.

The layer (a) will suitably have a weight of 10 to 100 grams per square meter (gsm) and preferably from 25 gsm to 50 gsm. The fiber size of the fibres used in the woven, non-woven or knit material is suitably from 0.1 to 100 microns. Embodiments wherein more than one of the above described layer (a) are positioned on top of each other are within the scope of the present invention. Applicants believe that one layer (a) is sufficient but it is not excluded to use more than one layer (a).

Layer (b) is a so-called wicking layer. The function of this layer is to quickly transport water away from layer (a) and thus away from the insulated metal surface and to remove the water to suitably a discharge point or to a preferred next void layer (b1). The wicking layer should be sufficiently hydrophilic and porous so as to ensure that any water in layer (a) is easily and quickly drawn into the wicking layer by hydrophilic and capillary forces. The wicking layer should be sufficiently thick to avoid complete saturation with water of said layer. Complete saturation is to be avoided because wicking layer (b) would then loose its ability to remove any water from layer (a). Intake of water from layer (a) is suitably performed within seconds or minutes while the subsequent discharge of water from layer (b) can proceed more slowly from the larger volume of wicking layer (b). Layer (b) is thus not in direct contact with the exterior surface of the metal transport conduit.

Wicking layer (b) is suitably composed of a woven, non-woven or knit fabric, preferably a non-woven fabric and even more preferably a non-woven fabric made from a hydrophilic fiber such as cotton, viscose, for example Rayon, or polyamide, or surface treated fabrics, such as a polypropylene. An even more preferred non-woven fabric is a non-woven nylon as obtainable from companies like Fiberweb or Freudenberg. Other examples of suitable materials for the wicking layer (b) are the hydroscopic materials described in WO-A-2005/038330, which publication is hereby incorporated by reference and/or the filler material as described in WO-A-99/09346, which publication is hereby incorporated by reference. The wicking layer (b) preferably has a weight of 30 to 300 grams per square meter (gsm) and more preferably about 25 gsm to 50 gsm. The fabric will have a fiber size from 0.1 to 100 microns. The fabric is preferably made from a polymer that is dimensionally stable from about −5 to 175° C. The thickness of layer (b) will depend on the type of material, the method to discharge water from this layer and the expected volume of water which is to be removed locally. Embodiments with more than one layer of wicking material as described above on top of each other are within the scope of the present invention. Applicants believe that one layer (b) is sufficient but it is not excluded to use more than one layer (b).

In a preferred embodiment of the present invention a layer (b1) of a high void material is present between wicking layer (b) and insulation layer (c). The high void material layer (b1) is advantageous because it provides a drain which can take in water from the wicking layer (b) and/or the insulation layer (c) and subsequently provide a transport channel to discharge of said water from the insulation. Liquid water as present in layer (b) will evaporate at the interface between layer (b) and layer (b1). Layer (b1) then allows for quick transport of this evaporated water. Transportation can be passive transport, for example natural draft, or may by means of a transport gas, for example hot air, preferably hot and dry air, which is supplied to layer (b1) at a first point. At a second point spaced away from said first point the gas is subsequently discharged from layer (b1) and from the insulation composition. Along the way evaporated water is picked up in the high void layer and an efficient and quick method to dry an insulation composition is obtained. This method of discharging water from an insulation composition is more effective than the prior art method described in the earlier referred to JP2002181280 because the pressure drop will be lower and because water will concentrate in this layer making the pick up by means of the transport gas much more effective. The method is also an improvement over the method described in SU 1772509. This publication describes the use of a locally positioned absorbent, which collects water. The absorbent is regenerated by pumping a hot gas over the absorbent. The present system is advantageous because it is simpler and it makes a continuous removal of water possible.

The high void material is suitably structurally strong such to maintain the high void properties when applied as part of an insulation composition. The material is an open structure that allows for easy movement of a gas, for example the transport gas. The high void space is furthermore advantageous because of the resulting low pressure drop over the distance between the spaced away first and second points described above.

The different elements of the insulation composition comprising the high void material layer (b1) may be combined when applying the composition to a surface to be insulated. In a preferred embodiment an intermediate composition, comprising layers (a), (b) and (b1), are combined with insulation material layer (c) when positioning the insulation composition on the metal surface to be insulated. The invention is thus also directed to such an intermediate composition comprising the following layers (a) a hydrophobic, moisture permeable layer composed of a woven, non-woven, or knit fibrous material, (b) a hydrophilic wicking layer, and a layer (b1) of a high void material. This intermediate composition can be used to manufacture the insulation composition according to the invention. In addition the composition can also be used to keep metal surfaces dry in situations where insulation is not the primary objective of the use. In this use no insulation layer (c) is present. When used in this other, non-insulating, application the composition can also comprise a cover sheet of a polymer or metal material. Polymer cover sheets may be a poly-olefin sheet, e.g. a PE or PP sheet and examples of a metal sheet are for example aluminum foil or sheet also referred to as aluminum cladding. The high void material layer (b1) of this composition is advantageous for the same reasons as described earlier for the insulation composition in that it provides a drain which can take in water from the wicking layer (b) and subsequently provide a transport channel to discharge of said water from the composition. Transportation can be passive transport or more preferably by means of a transport gas, for example hot air, which is supplied to layer (b1) at a first point. At a second point spaced away from said first point the gas is subsequently discharged from layer (b1) and from the composition. Along the way evaporated water is picked up in the high void layer and an efficient and quick method to dry the composition is obtained.

The high void material can be a knit fibrous material, sometimes also referred to as Spacer 3D, or a so-called three dimensional fiber network. An example of a suitable knit fibrous material is Spacetec as obtainable from Heathcoat Fabrics Ltd. A suitable three dimensional fiber network is a so-called embossed material comprised of one or more sheets of woven fibers which are spaced away from each other by means of projections as for example described in U.S. Pat. No. 5,364,686. The projections are portions of the sheet of woven fiber which rise above the base plane of the sheet. The material of the fiber may be a metal material or a polymer material, such as a thermoplastic material. Such a network can be obtained by molding a textile fabric impregnated with a thermoplastic or more preferably by molding a thermoplastic fabric, wherein the mold is shaped such that the above projections are formed when molding. The projections can have many designs and rise about between 2 and 20 mm above the base plane of the sheet. The fabric which may be woven or knit and should be sufficiently permeable for water and/or water vapor. The thermoplastic is preferably a hydrophobic fiber with a diameter of 0.02 mm to 0.2 mm, preferably 0.05 mm. The thermoplastic is preferably dimensionally stable from about −5 to 175° C. Preferred thermoplastic materials are polyethylene terephthalate or polyether sulphone. The layer preferably has a void ratio e of between 5 and 50 wherein void ratio is defined as the Vv/Vs in which Vv is the volume of void and Vs is the volume if solid material in the high void material. The bulk density will suitably be between 0.02 g/cc and 0.2 g/cc. The thickness of the high void material layer (b1) should be sufficient to transport water away from the insulating composition in combination with an acceptable pressure drop. Suitably the layer (b1) is at least 2 mm and more preferably at least 5 mm thick. The upper limit is less critical, but in order to avoid a very thick insulation composition layer (b1) is preferably at most 20 mm thick.

The three dimensional fiber network materials which may be used for layer (b1) may be the same three dimensional fiber networks used for mattresses in hospital beds and car seats as for example described in U.S. Pat. No. 6,701,556. Because for the present application the 'feel' for the patient or car driver is less important also three dimensional fiber networks can be used which are not optimal for these applications but have the desired high void and structural strength properties as suited for the presently invented application.

The insulation material present in insulation material layer (c) may be any known type of insulating material. The insulating material may be of the open or closed cell type. Examples of closed cell type insulating materials are foamed rubber or foamed plastic. Examples of open cell insulating materials are mineral wool as for example glass wool, rock wool or slag wool obtainable from Rockwool International A/S, foamed open-cell plastic and polyurethane foam. or may further alternatively comprise combinations of the materials mentioned above The thickness of the layer will depend on the required insulation. For example one to four layers of commercially available insulation material may be combined wherein each individual layer may have a thickness of between 25 and 150 mm.

In a preferred embodiment a second high void material layer (d) is present on the insulation material layer (c). This second high void material layer (d) is present at the side of layer (c) not facing earlier referred to wicking layer (b) or high void material layer (b1). This second high void layer can effectively remove any water entering the insulation from the exterior before it reaches the insulation material layer (c). Possible high void materials for use in layer (d) are as described for layer (b1), wherein for an insulation composition the high void material in layer (b1) may be the same or different from the high void material of layer (d). The thickness of layer (d) may be between 2 and 20 mm.

Applicants found that such a high void layer (d) can also be used in combination with an insulation layer (c) as such. The invention is thus also directed to an insulation composition comprising a layer of insulating material, as described above, and a layer of a high void material as described above. The invention is also directed to an insulated metal transport conduit comprising a metal transport conduit, the insulation material and a cover sheet (e), wherein between insulation material and cover sheet (e) a layer (d) of the high void material is present.

The insulation composition is suitably used to insulate a metal vessel, metal apparatus, and more preferably a metal transport conduit. Examples of vessels are heat-exchangers, storage tanks and reactors. The temperature of the metal surface facing the insulation may be below or above the dew point of water. The insulation may have the function to avoid heating or avoid cooling of the metal surface by the ambient air present at the metal surface. Preferably the insulation is present to avoid cooling of the metal surface. The temperature of the metal surface to be insulated is suitably from 30 to 175° C. The metal may be stainless steel and especially carbon steel and the so-called 300 series stainless steels. It is especially such surfaces and temperature conditions wherein corrosion in the presence of liquid water can readily occur. On the carbon steels it manifests as generalized or localized wall loss. With the stainless pipes it is often pitting and corrosion induced stress corrosion cracking (CISCC). Such corrosion can now be avoided by using the insulation composition according to the present invention.

The invention is especially directed to refinery, LNG, GTL and chemical processing pipelines and steam pipelines in general which pipelines are made of steel piping and insulated with an insulating composition according to the invention and protected with an aluminum cover. Pipelines and transport conduits have the same meaning in the context of the present invention. Unfortunately, moisture cannot be completely excluded from the insulation of such a pipeline and, by the natural hot/cold cycles of the day, vapor condenses in the insulation and collects against the pipe. Over time, this condensation can cause, through electro-chemical reactions, the corrosion of the pipe. In the extreme, this can cause leakage/release from liquids, gases and slurries. This may lead to loss of production yield, unintended shut-downs and hazardous situations. Moreover the presence of water in the insulation material reduces its insulating value and forces the frequent replacement of insulation.

The invention is thus especially directed to an insulated metal transport conduit comprising a metal transport conduit and an insulation composition as described above, wherein the moisture permeable sheet of layer (a) contacts the outer surface of the metal transport conduit and wherein a cover (e) is present at the exterior of the insulation composition.

The cover (e) is a diffusion proof layer at the outside of the insulation composition relative to the inner positioned conduit to be insulated. The diffusion proof layer may suitably be a plastic or metal foil, e.g. an aluminium foil or sheet also referred to as aluminium cladding.

The insulation composition described above is not only suitable for insulating the actual transport conduit, but also for mounting on valves, flanges, fittings and the like, which are built into or attached to the conduit. Although cover (e) is substantially diffusion proof water nevertheless can enter the insulation composition where the cover (e) is damaged or at locations where different parts of the insulation composition connect. Because of this unavoidable ingress of water into the insulation composition liquid water can accumulate on the metal surface to be insulated. By using the insulating composition according to the present invention the presence of liquid water can be avoided or at least the time at which the liquid water is present on the surface can be reduced. This reduces the accumulation of corrosion.

The insulated metal transport conduit preferably has a layer (b1) of a high void material between wicking layer (b) and insulation layer (c). Preferably layer (b1) is fluidly connected to a means to discharge water from said layer (b1) to the exterior of the insulated metal transport conduit. Such a discharge can be a drain pipe as for example described in WO-A-2007061311. Water as present in the insulation composition can for example evaporate into high void layer (b1) and be subsequently transported by passive transport to said means to discharge water. In addition the insulated transport conduit preferably also has an supply means to add a transport gas to layer (b1) such that evaporated water can be picked up between said inlet means and outlet means in layer (b1) as described above.

Detection of CUI (Corrosion under insulation) in industrial plants has been identified as a significant problem, which can affect the integrity of tanks and pipes and lead to a shortening of the lifespan or even outright failure of expensive industrial infrastructure. Lengthy inspections and equipment failures often lead to manufacturing facility downtime, and consequently a loss of efficiency and increase in associated costs. One insidious aspect of CUI is that the corrosion is hidden from view by the thermal insulation. Typically, plants have miles of piping and thousands of square feet of insulation covered equipment. It is neither practical nor economical to remove the insulation at all locations for direct inspection. For the assessment of CUI a wide range of non-destructive techniques have been proposed, as described by Michael Twomey, NDTnet 1998 February, Vol. 3 No. 2, INSPECTION TECHNIQUES FOR DETECTING CORROSION UNDER INSULATION. Examples of techniques are eddy current measurements to measure the wall thickness, radiography techniques, guided wave techniques and the use of hand-held thermal imaging cameras to identify locations of wet thermal insulation. The known methods are however not optimal because of their costs, their complexity, the requirement to remove the insulation before inspection and/or the highly laborious character of the method. Other disadvantages are that most methods are not suited to measure on a continuous basis and/or that some methods are not distinctive.

There is, therefore, a widespread but presently unmet need for an efficient and accurate detection system capable of identifying likely CUI corrosion sites in a variety of industrial manufacturing and processing environments.

Examples of the above methods will be briefly discussed. WO201050617 describes an inspection method for inspecting corrosion under insulation, in piping to which a heat insulator is provided, the method comprising: providing a fiber optical Doppler sensor to the piping; and inspecting the corrosion in the piping by using the fiber optical Doppler sensor. A disadvantage of this method is that first corrosion has to occur before it can be detected.

WO201053813 describes a method of detecting corrosion under insulation. The method utilizes infrared imaging video cameras to detect characteristic signatures of wet thermal traits on process equipment and communicating said corrosion related data to an operator. This method detects wet areas in the insulation. This is advantageous because it will identify areas where the risk of corrosion may be significant. This method enables maintenance of the equipment based on risk based inspection. This is advantageous because insulation needs to be removed less for an actual inspection and only the locations, where corrosion may be expected, are inspected. A disadvantage of the method is that an operator has to scan the entire length of the pipe with a camera.

WO-A-2010/143948 describes a system wherein the local temperature and humidity values are measured in the insulation surrounding a pipeline. These values are said to be an indication related to local corrosion and degradation of the pipeline. A high humidity and a certain temperature may indicate that corrosion can occur locally. Applicants however believe that this system may still give rise to many falls calls.

Applicants now found a new method to detect and locate liquid water in an insulation composition positioned around an insulated metal transport conduit, wherein the insulation composition comprises of a layer of wicking material and wherein the layer of wicking material comprises measuring means to measure the presence of liquid water. Applicants believe that the presence of liquid water is a better indicator that corrosion is taking place locally and that this method will give far less falls calls than the method described in WO-A-2010/143948. A further advantage is that the method is more simple in that it measures less properties in the insulation than the prior art method which is based on the measurements of temperature, humidity and in some cases also the chloride, ammonia and nitride contents.

The means to detect liquid water can be those known to the skilled person. Examples of suitable means are water sensible coatings. Water sensible coatings are preferably used in combination with a single thin waveguide. In such use the presence of liquid water will change the colour of the coating. By passing light through the waveguide a change of colour will be detected. Since the speed of light in the waveguide is known the position of the colour change and thus the presence of liquid water can be determined.

Another means to detect liquid water is by measuring the local electrical conductivity in the wicking layer. This detector suitably comprises an ohm-meter or multimeter and a pair of electrodes. An example of such a method is described in DE-A-3930530. This method compares the conductivity between a point within the insulation with the metal pipe. This is disadvantageous because of the varying potential of a pipe in an industrial environment. Preferably the presence of liquid water is measured by measuring the local electrical conductivity within the wicking by having two measuring electrodes present within this layer itself. A minimum amount of water present between the two measuring electrodes will close the so-called electrical bridge and allow a small current to run between the two electrodes. Suitably the detector is operated in a so-called I/O mode allowing detection of either presence or absence of liquid water. The number of pairs of electrodes in the wicking material will be dependant on the desired accuracy. The output of the ohm-meter can be sent to an electronic device for triggering action, data acquisition and/or storage. Communication of the numerous measurements along a transport conduit to a central data processing unit may for example be performed by applying a multiplex technique to the various signals and communicating the collected signals via one single coaxial cable to said central data processing unit.

The electrodes of the detector suitably comprises of a non-corroding electrical guiding material, e.g. a silver wire and length; but also include electrical guiding components printed on flexible, non-electrical guiding materials such as poly ethylene. The electrodes are suitably directly applied to, or interwoven in the various wicking layers of the insulation composition. The detection limit of this detection system will depend on a number of typical detector dimensional parameters allowing the system to be tuned towards the application needs. Such detectors are known to the skilled person. For example the detectors may be the same as the detectors used in a so-called Protimeter, a commercially available moisture meter.

The intrinsic dispersion of liquid water in the wicking layer leads to significant lowering of the minimum volume of detectable water. When applied to a transport conduit the detectors are suitably uniformly distributed in the wicking material. The pairs of electrodes of one detector may be spirally wrapped around the axis of the transport conduit for a certain length of the insulated conduit. Other models of wrapping may be applicable for achieving adequate spatial resolution in e.g. non-linear, non uniform applications such as flanges and pumps, reactors and/or other process equipment.

Because water will accumulate in the wicking layer any liquid water which is present in the insulating composition can be effectively detected without having to use a large array of measuring means across the entire insulating composition. If no water is detected in the wicking layer it can be safely concluded that no water is or has been present on the metal surface and that therefore the corrosion risk at that location can be considered to be low. Thus locations of corrosion risk can be identified and maintenance based on risk based inspection can be performed in a more simple manner.

The invention is thus also directed to an insulated metal transport conduit having a layered insulation composition placed around said conduit, wherein the insulating composition comprises a wicking layer and wherein the wicking layer comprises a means to measure the local electrical resistance in said layer. The wicking layer may as described for wicking layer (b) above. The insulation composition is preferably an insulation composition according to the present invention.

The detection of water by means of the above method can trigger an inspection of the insulation at the location where water is detected or can be used as a trigger to start providing a transport gas as described above to a high void layer (b1), if present. The supply of transport gas can be terminated once the measurement of the local conductivity indicates that the water has been removed or when the content of water in the transport gas as it leaves the insulation reached a certain minimum value. The transport gas and its use as described above can also be advantageously used to detect leakage of the insulated process pipelines. Such leaks may be caused by damaged seals between flanges or by, illegal, tapping. The method comprises supplying a transport gas to the high void material layer at one position and discharging the transport gas at a second location and analyzing the composition of the transport gas as it leaves the insulation composition for components which are present in the insulated pipelines. This method is suited to measure small leaks of for example hydrogen or other flammable components. Thus the invention is also directed to a method to detect leakage of an insulated metal transport conduit comprising a metal transport conduit and an insulation composition, wherein the insulation composition comprises of a layer (b1) of a high void material, by supplying a stream of gas to the layer of high void material at a first point and discharging a stream of the gas and any leaked components from the insulated transport conduit from the high void material at a second point and analyzing said discharged stream for such a component.

The insulation composition disclosed herein is described in reference to the drawings, with the absolute and relative dimensions of the layers in the drawings chosen to more clearly illustrate the composition and are not necessarily the most optimal dimensions.

Figure 1:
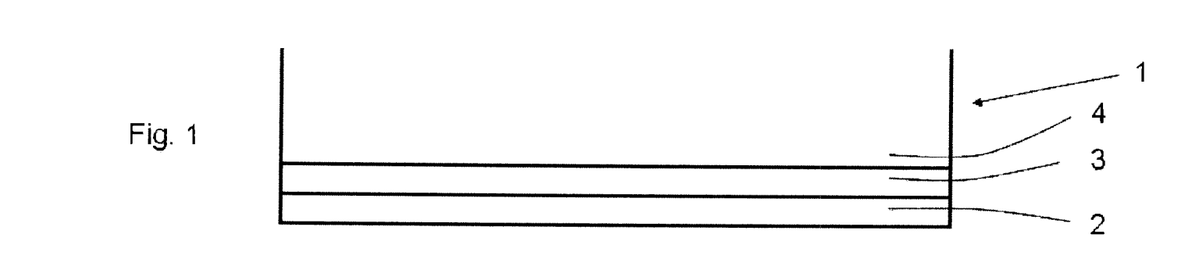
FIG. 1 is an insulation composition according to the invention.

FIG. 1 shows an insulation composition (1) having a hydrophobic moisture permeable layer (2), a hydrophilic wicking layer (3) and insulation material layer (4).

Figure 1A:
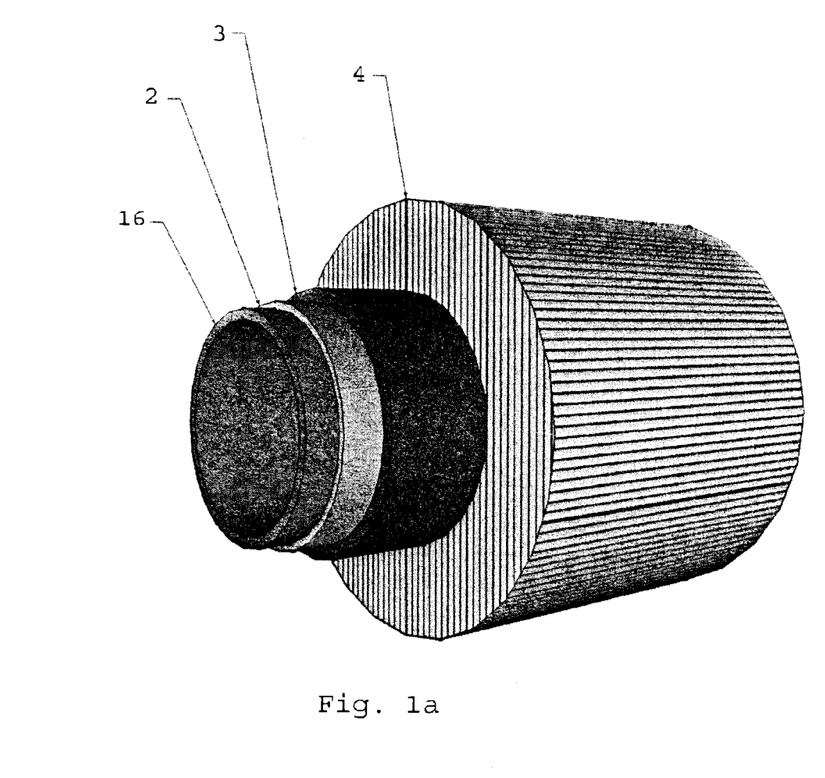
FIG. 1a is a three-dimensional view of the insulation composition of FIG. 1.

FIG. 1a shows a three-dimensional view of the insulation composition and metal surface of FIG. 1 also showing part of a metal surface (16) of a conduit.

Figure 2:
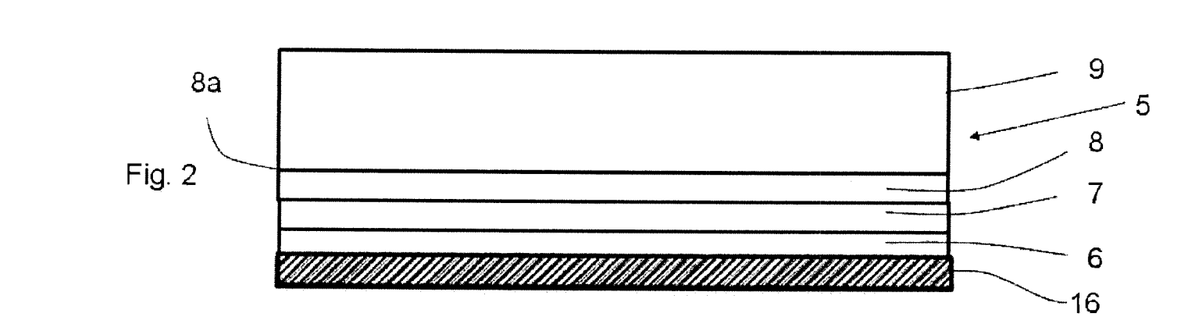
FIG. 2 is a preferred insulation composition according to the invention.

FIG. 2 shows an insulation composition (5) according to the invention and part of a metal surface (16) of a conduit to be insulated. FIG. 2 further shows a hydrophobic moisture permeable layer (6), also referred to as the drying layer, as a thin hydrophobic fabric that separates the metal surface (16) from a wicking layer (7). The wicking layer (7) draws water off the surface of the metal surface (16), through the drying layer (6) and quickly distributes it throughout a large region of the wicking layer (7). Once distributed through the wicking layer (7), the water evaporates in a layer (8) of a high void material. On the other side of the high-void layer (8) and facing away from the wicking layer (7) an insulation material layer (9) is present. When wet, this insulation layer (9) is also dried by the natural evaporation of the water from the insulation material layer (9) or accelerated by air forced through the high-void layer (8). Optionally a water impenetrable polymer film (8a) may be used to isolate the insulation layer (9) from the high-void layer (8).

Figure 2A:
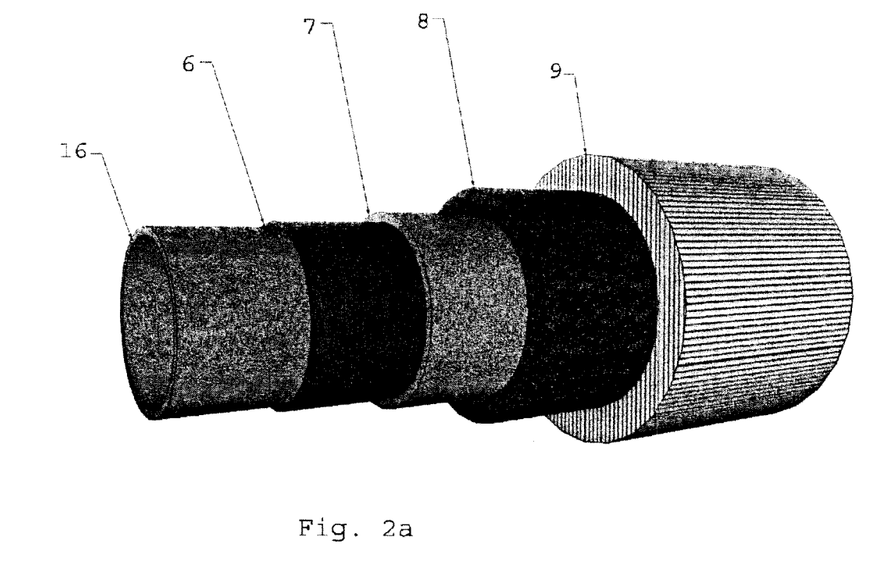
FIG. 2a is a three-dimensional view of the insulation composition of FIG. 2.

FIG. 2a shows a three-dimensional view of the insulation composition and metal surface of FIG. 2.

Figure 2B:
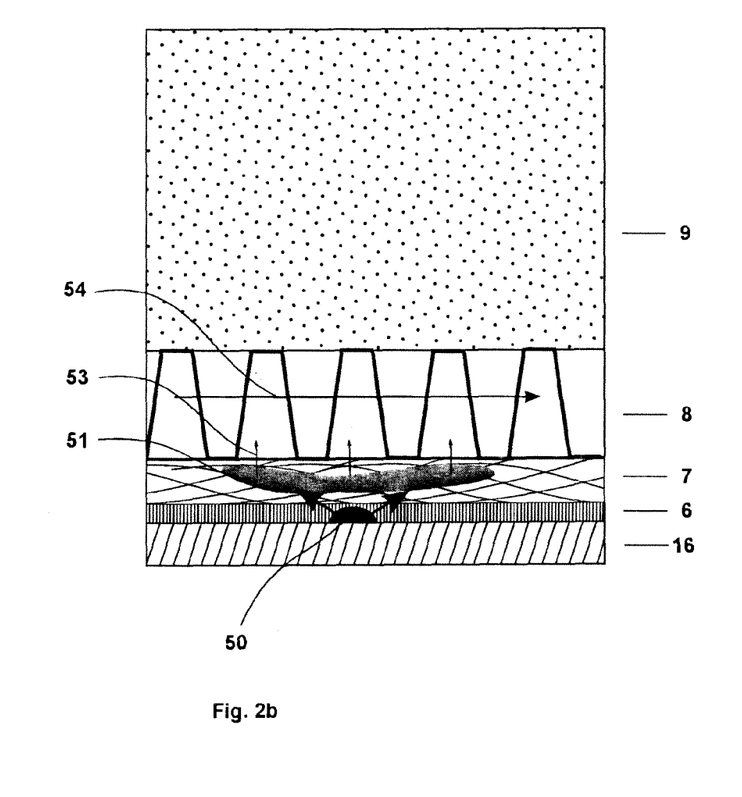
FIG. 2b shows the working of the insulation composition of FIG. 2.

FIG. 2b shows how a liquid water droplet 50 is drawn into the wicking layer (7) by the combined working of the water permeable and hydrophobic layer (6) and the next wicking layer (7). In the wicking layer the liquid water will be readily distributed over a larger volume, e.g. from a droplet (50) having the dimensions of a few square millimeters to a water/wicking layer volume (51) of a few square centimeters. This larger area will greatly enhance the evaporation (53) of water into the next high void layer (8). In this layer the gaseous water can be transported away in direction (54).

Figure 3:
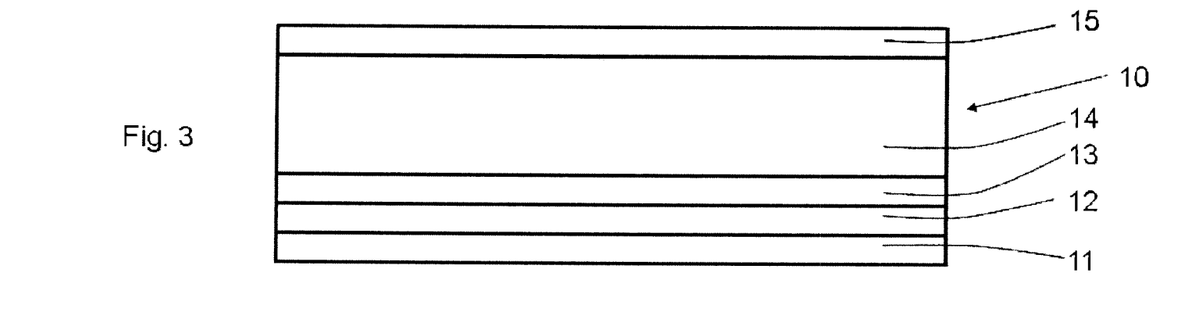
FIG. 3 is a next preferred insulation composition according to the invention.

FIG. 3 shows an insulation composition (10) comparable to insulation composition (5), having a hydrophobic layer (11), a wicking layer (12), a layer (13) of a high void material and an insulating material layer (14). In addition an additional layer (15) of a high void material is present at the side of the insulation material (14) which does not face layer (13).

Figure 4:
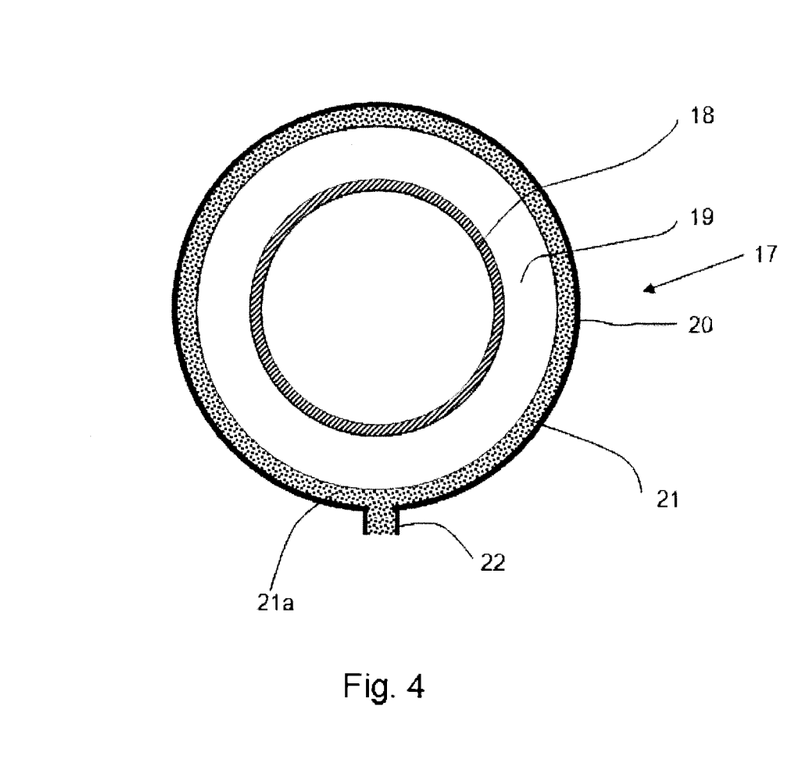
FIG. 4 is a transport conduit and an insulation composition according to the invention.

FIG. 4 shows a cross-sectional view of an insulated metal transport conduit (17) comprising a metal transport conduit (18), an insulation material layer (19) and a cover sheet (20). Between insulation composition (19) and cover sheet (20) a layer (21) of high void material is present. Between layer (21) and insulation material layer (19) a water impenetrable polymer film (21a) may be present avoid water entering the insulation material layer (19) from the layer (21) of high void material. Water will as a result flow due to gravity to the lower end of the insulated transport conduit (17) and can subsequently be discharged from said conduit via discharge opening (22).

Figure 5:
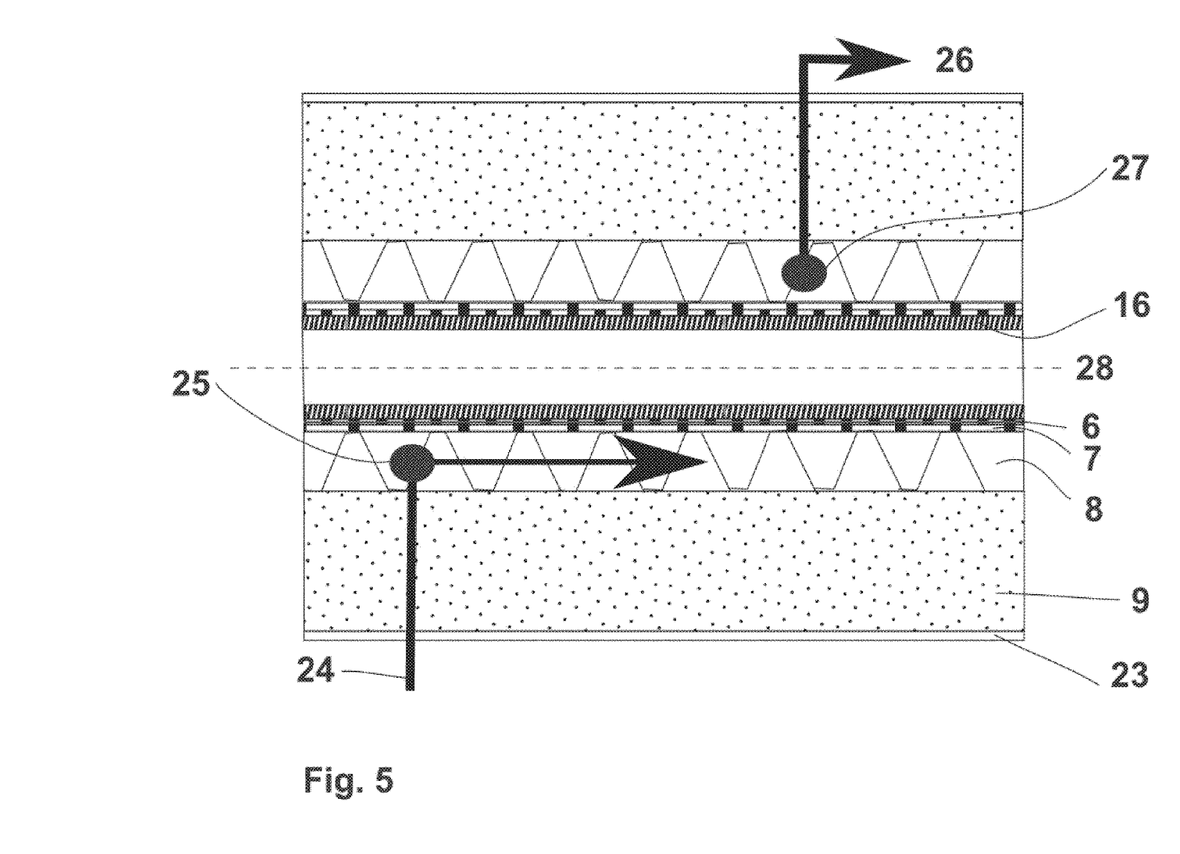
FIG. 5 is a transport conduit and an insulation composition having means to add a transport gas.

FIG. 5 shows an insulated transport conduit as in FIG. 2 provided with an optional layer (23) of a high void material. The cover sheet, which is typically present, is not shown in this figure. In FIG. 5 layer (8) of high void material is fluidly connected to a means (24) to supply a stream of gas to said layer (8) at a first position (25). Layer (8) is fluidly connected to a means (26) to discharge gas from said layer (8) at a second position (27). As shown in FIG. 5 first (25) and second position (27) are axially spaced away along the axis (28) of the insulated metal transport conduit.

The means to supply a transport gas and the means to discharge the gas loaded with water can be added to the insulated transport conduit at a later moment in time. For example, when after some years the water problem becomes apparent for a section of the insulated transport conduit such means may be added. This may be advantageous in order to minimize the initial investment and complexity of the system.

Figure 6:
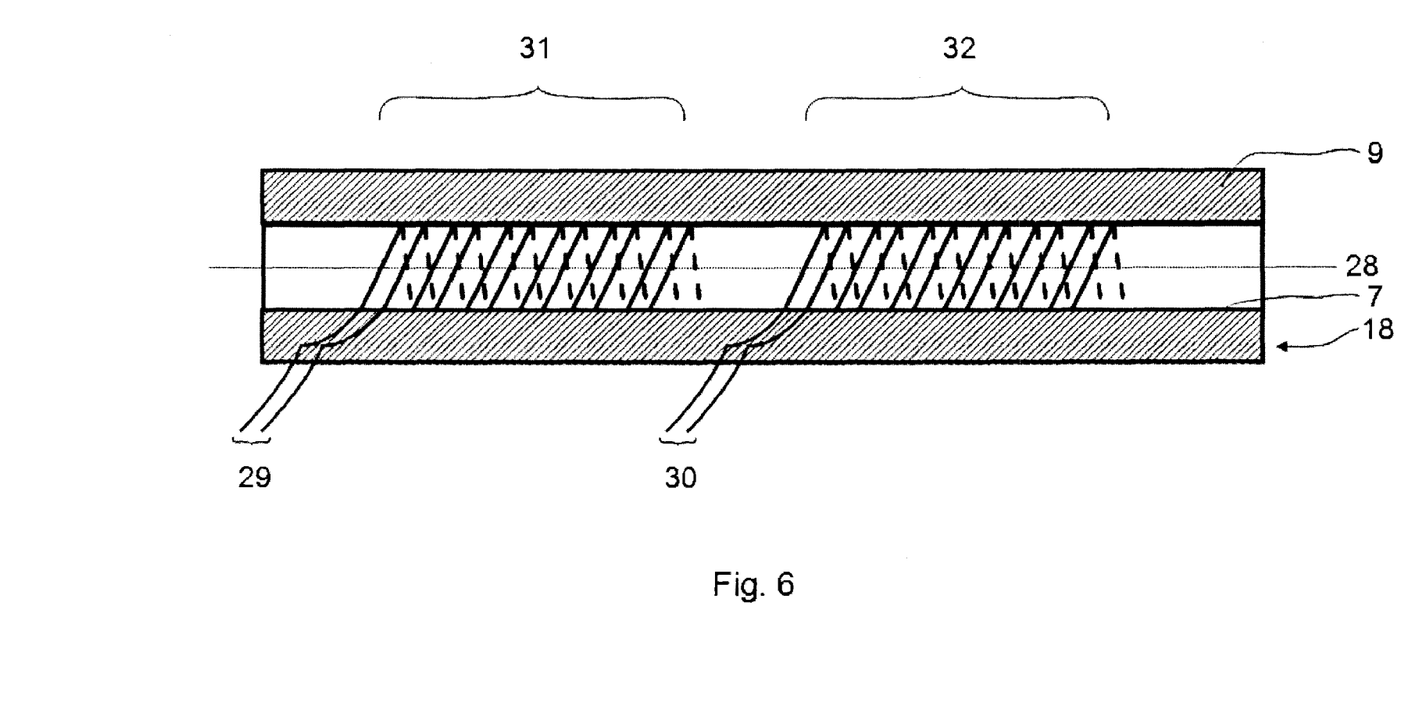
FIG. 6 is a cross-sectional view of an insulated transport conduit provided with a means to detect liquid water.

FIG. 6 shows a cross-sectional view of an insulated transport conduit (18) according to the present invention. In wicking layer (7) (layer (b)) two pairs of electrodes (29, 30) are present and spirally run along a section (31) and (32) respectively along the longitudinal axis (28) of the transport conduit (18). If water is detected by a pair of electrodes (29) or (30) one will know at which section water is detected by reference to the pair of electrodes that detect the liquid water. By having multiple pairs of electrodes, like pairs (29) and (30), along the axis of the transport conduit a system results which can simply detect and locate said water. The accuracy can be varied by varying the length of the section for each individual pairs of electrodes.

Figure 7:
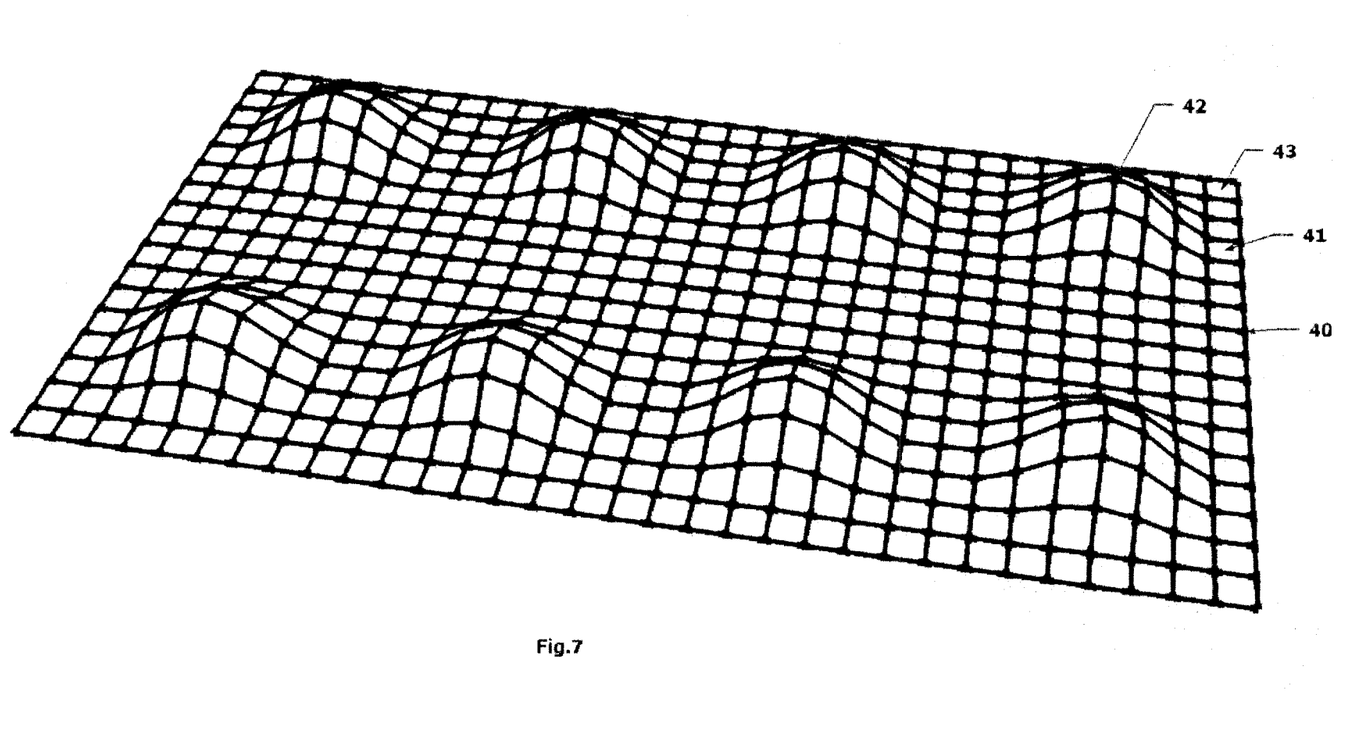
FIG. 7 is a schematic of a three-dimensional fiber network with portions of the sheet of woven fiber raising above the base plane of the sheet.

FIG. 7 shows one sheet (41) of a three-dimensional fiber network (40) having projections (42), which projections (42) are portions of the sheet (41) of woven fiber which rise above the base plane (43) of the sheet (41).

EXAMPLES

The invention will be illustrated by means of the following non-limiting examples.

Comparative Experiment A

A flat plate was heated to 65° C. to simulate the surface of an oil pipeline. Onto this plate a pair of thin electrodes separated by a gap of 0.5 mm was affixed. The resistance between these electrodes was measured by an ohm meter. Below 100 kΩ resistance water was considered to be present. At or above 2,000 kΩ resistance the surface was considered dry. To confirm that the detector worked, a single drop of water placed on the exposed electrodes. The resistance dropped from a value greater than 2,000 kΩ to less than 100 kΩ. When the water evaporated the resistance rose to a value greater than 2000 kΩ.

On the plate with the electrodes a layer of wicking material composed of a thin, woven, polyester fabric was placed. 5 drops of water were added to the layer at the location of the electrodes. The electrodes detected a dry surface in 90 seconds.

Example 1

Comparative Experiment A was repeated except that between the wicking layer and the surface with the electrodes a flat, thin, knit polypropylene fabric was placed between the electrodes and the wicking layer. After the 5 drops of water were added a dry surface was detected in 30 seconds.

Comparative Experiment B

A fiberglass insulation material having the dimensions of 10 cm×10 cm×5 cm was placed directly onto the plate with the electrodes of Experiment A. 15 ml of water were injected at the center of the fiberglass insulation at 0.5 mm above the electrodes. The entire volume was absorbed by the insulation. The resistance immediately dropped to <100 kΩ and only rose as the surface approached dry. Although only about 3 ml of water evaporated from the system (the remainder trapped in the insulation) the electrodes and the surface were dry in 9 minutes.

Example 2

On the surface of a horizontal mounted pipe surface a detector 1 was placed consisting of two blank iron wires of 0.5 mm spaced apart by 2.5 cm. The wires or electrodes were connected to a multimeter, type ELRO M300, capable of measuring electrical resistance up to 2000 kΩ between the two electrodes at timed intervals. Subsequently a layer of polypropylene (layer (a)) was placed over the electrodes. The polypropylene layer had the following properties:
  Fiber Diameter: 15 μm
  Fiber Length: continuous
  Fiber Shape: 32 projection winged fiber
  Fabric Construction: hydro-entangled nonwoven spunbond
  Basis weight: 65 gsm On top of layer (a) a layer of Switch, Nedac Sorbo(art. #76348) (55% Polyester; 25% Polyamide; 20% Polyurethane) as wicking material was placed having a thickness of 1 mm. At the exterior of the wicking material another set of electrodes (detector 2) as above was placed. Subsequently a layer (b1) of 10 mm of a high void material was placed on top of layer (b) consisting of knitted PES having a void ratio e of 20. A next layer of 4 cm of standard fiberglass insulation material as obtained from Rockwool (Rockwool 850) was placed. On top of the insulation material a sheet of polyethylene was placed and on top of said sheet a next layer (d) of a high Void 3D material being Dacron non-woven sheet (100 gsm) having a thickness of 10 mm was placed The entire pipe and insulation was covered with a sheet of aluminum foil.

The aluminum foil was perforated at the top end of the insulation with 1 perforation and at the bottom end of the insulation with a row of 3 perforations just below the upper perforation. Each perforation had a surface area of 1 cm². Through the top perforation, 20 ml of water was injected into the high void material of layer (d). After about 3 seconds, water was pouring out through the bottom holes and 95% of the water was removed from the holes at the lower end of the pipe within one minute.

No liquid water was detected by detector 1 or detector 2 system (measuring a resistance R of greater than 2000 kOhm during the entire experiment). After removing the aluminium sheet, only very little water was observed in the high void material layer (d). After inspection no water could be detected to have entered the thermal insulation material as measured by a protimeter.

Example 3

An insulated pipe of Example 2 was made except that layer (b1) now was composed of 5 mm of a embossed black 3-D material. The 3-D material is an embossed material made from knit PET fibers having a fiber diameter of 0.1 mm and a pore size opening of between 0.5 and 1 mm wherein the knit fibers are molded with a mold shape having single sided cylindrical projections of 0.5 cm by 0.5 cm cylinders which are regularly spaced with 1 projection per cm.

To this layer (b1) air of 35° C. and a relative humidity of 35% was supplied at one end of the pipe and discharged at the other end of the pipe along its longitudinal axis.

1 ml of water was injected into layer (b) (the wicking layer). After 600 seconds the flow of air was turned on for 150 seconds. The results for detector 1 and detector 2 are summarized in Table 1.

TABLE 1

| Time (seconds) | Detector 1 signal (kOhm) | Detector 2 signal (kOhm) | Action |
|---|---|---|---|
| 0 | >2000 | >2000 | Injection water |
| 30 | >2000 | 35 | |
| 300 | >2000 | 11 | |
| 600 | >2000 | 24 | Air flow on |
| 750 | >2000 | >2000 | Air flow off |

Example 4

Example 3 was repeated except that 2 ml of water was injected into layer (b) (the wicking layer). After 90 seconds the flow of air was turned on for 450 seconds. The results for detector 1 and detector 2 are summarized in Table 2.

TABLE 2

| Time (seconds) | Detector 1 signal (kOhm) | Detector 2 signal (kOhm) | Action |
|---|---|---|---|
| 0 | >2000 | >2000 | Injection water |
| 90 | 110 | 10 | Air flow on |
| 300 | 275 | 90 | |
| 540 | >2000 | >2000 | Air flow off |

Example 5

Example 3 was repeated except that 10 ml of water was injected into layer (b) (the wicking layer). After 30 seconds the flow of air was turned on for 1050 seconds. The results for detector 1 and detector 2 are summarized in Table 3.

TABLE 3

| Time (seconds) | Detector 1 signal (kOhm) | Detector 2 signal (kOhm) | Action |
|---|---|---|---|
| 0 | >2000 | >2000 | Injection water |
| 30 | 115 | 0 | Air flow on |
| 300 | 170 | 0 | |
| 900 | >2000 | 116 | |
| 1080 | >2000 | >2000 | Air flow off |

The above examples illustrate that liquid water can be detected and removed within a relatively short period of time from an insulated transport conduit. Imagine a situation wherein liquid water can be present on the metal surface of a transport conduit unnoticed for e.g. a year and can cause 4 mm of corrosion accumulation (at a rate of e.g. 4 mm/year). With the present invention liquid water can be detected and removed within an hour reducing the accumulation of corrosion by a factor of 8000.

The invention claimed is:

1. An insulation composition for a metal vessel or transport conduit, comprising the layers in the order of, from the innermost layer to the outermost layer:
   (a) a hydrophobic, moisture permeable layer composed of a woven, non-woven, or knit fibrous material, wherein the hydrophobic, moisture permeable layer contacts the outer surface of a metal vessel or transport conduit,
   (b) a hydrophilic wicking layer composed of a woven, non-woven or knit fabric-disposed on the hydrophobic layer,
   (b1) a layer of high void material that is a three-dimensional fibrous material with an open structure, wherein the high void material is designed to serve as a transport channel to allow transport of water away from the hydrophilic wicking layer or the insulation layer, or both; and
   (c) an insulation material layer, on the outer side of the high void layer.

2. An insulation composition according to claim 1, wherein the high void material (b1) has a void ratio e of between 5 and 50, wherein the void ratio is defined as the Vv/Vs in which the Vv is the volume of the void and Vs is the volume of solid material in the high void material.

3. An insulation material according to claim 1, wherein the three-dimensional fibrous material is an embossed material comprised of one or more sheets of woven fibers which sheets having projections, which projections are portions of the sheet of woven fiber which rise above the base plane of the sheet.

4. An insulation composition according to claim 1, wherein the high void material layer (b1) has a thickness of between 2 and 20 mm.

5. An insulation composition according to claim 1, wherein the fibrous material of layer (a) is polyethylene terephthalate or polyether sulphone.

6. An insulation composition according to claim 1, wherein a high void layer (d) is present at the side of layer (c) not facing the high void material layer (b1).

7. An insulation composition according to claim 6, wherein between the high void layer (d) and the insulation layer (c), a water impermeable sheet is present.

8. An insulation composition according to claim 1, wherein the layer of wicking material comprises means to detect liquid water by measuring the local electric conductivity.

9. An insulated metal transport conduit comprising a metal transport conduit and an insulation composition according to claim 1, wherein the layer (a) contacts the outer surface of the metal transport conduit and wherein a cover (e) is present at the exterior of the insulation composition.

10. An insulated metal transport conduit according to claim 9, wherein layer (b1) is fluidly connected to a means to discharge water from said layer (b1) to the exterior of the insulated metal transport conduit.

11. An insulated metal transport conduit according to claim 9, wherein the wicking layer (b) comprises measuring means to measure the presence of liquid water.

12. An insulated metal transport conduit according to claim 10, wherein the wicking layer (b) comprises measuring means to measure the presence of liquid water.

13. An insulated metal transport conduit according to claim 11, wherein the measuring means can measure the presence of liquid water by measuring the local electrical resistance.

14. An insulated metal transport conduit according to claim 12, wherein the measuring means can measure the presence of liquid water by measuring the local electrical resistance.

15. A method to detect and locate liquid water in the insulation composition of an insulated metal transport conduit according to claim 11, by measuring the local electric conductivity in the wicking material, preferably by measuring the local electric conductivity in the wicking layer of the insulation composition at various locations along the axis of the insulated metal transport conduit.

16. A method to detect and locate liquid water in the insulation composition of an insulated metal transport conduit according to claim 11, by measuring the local electric conductivity in the wicking material, preferably by measuring the local electric conductivity in the wicking layer of the insulation composition at various locations along the axis of the insulated metal transport conduit.

* * * * *